July 27, 1926.

U. J. SCHREINER ET AL 1,593,604

ARTIFICIAL BAIT

Filed April 26, 1922

Urban J. Schreiner
Alan Jones
INVENTORS

BY
Erwin, Wheeler & Woolard
ATTORNEYS.

Patented July 27, 1926.

1,593,604

UNITED STATES PATENT OFFICE.

URBAN J. SCHREINER AND ALAN JONES, OF FORT ATKINSON, WISCONSIN.

ARTIFICIAL BAIT.

Application filed April 26, 1922. Serial No. 556,646.

This invention relates to artificial baits.

Objects of this invention are to make an artificial bait which will resemble a live bait roughly both in color and contour, and which will, when drawn through the water, simulate the motions of a live bait.

Further objects are to provide an artificial bait which may be cheaply manufactured from any suitable material, particularly from pork rind; which may be cheaply and readily formed; and which will be comparatively durable.

An embodiment of the invention is shown in the accompanying drawings, in which,—

Figure 1:
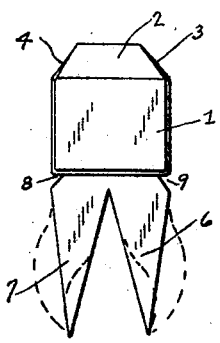
Fig. 1 is a view of the bait.
Figure 2:
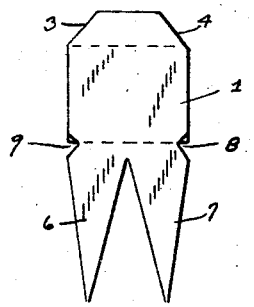
Fig. 2 is a similar view taken from the opposite side of Fig. 1.

The bait comprises an enlarged body portion 1 which has an abrupt, tapered or wedged shaped portion 2 having converging sides 3 and 4. In forming this bait it is preferably so cut that the flat side 5 is composed of the skin of the pork, while the enlarged body portion 1 is composed of the adhering flesh.

From the body portion 1 a pair of tapered legs 6 and 7 extend as a continuation of the flat side 5. These legs are integral with the other portions of the bait, and are formed of the skin or tough portion of the rind. At the point where they join the body portion, a pair of notches 8 and 9 are formed so as to increase the flexibility of the joint or union between the legs and body portion.

Figure 3:
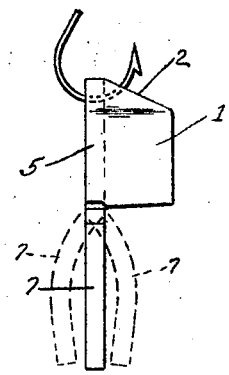
Fig. 3 is a side view showing the bait in position upon a hook.
Figure 4:
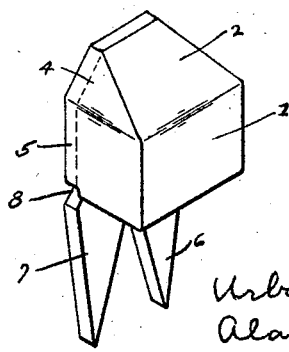
Fig. 4 is a perspective view of the bait.

When it is desired to use the bait it is placed upon a hook in the manner shown in Fig. 3 by passing the hook through the forward, tapered end of the body portion. This, it will be seen, provides a firm grip or bearing from the hook as such hook is passed through the skin portion of the pork rind. When this bait is drawn through the water eddies are produced about the body portion, and an irregular life like motion is given to the bait. At the same time the legs 6 and 7 vibrate back and forth in a manner very similar to that of the hind legs of a frog. This bait, it will be seen, very closely simulates the motion of a frog or a live bait. The abrupt shoulder at the rear end of the relatively thick body portion is preferably located wholly at one side of the legs or substantially so, and this tends to reduce the pressure of the water upon that side of the legs and also develops stream lines that are very effective in producing the desired leg movements.

It is contemplated in the practice of this invention to dye the bait with aniline dyes to give the desired color thereto. It will be seen, therefore, that roughly in contour and as well as in color the bait simulates a live bait, and that this similarity is greatly enhanced by the motion of the bait and of the legs as it is drawn through the water.

We claim:

1. An artificial bait formed of pork rind and comprising a body portion having a flat side formed of the skin of the rind and a projecting portion formed of the flesh of the rind, the skin of the rind being extended to provide a pair of rearwardly tapering legs flexibly yieldable vertically and positioned within the influence of eddy currents resulting from the movement of the body portion through a fluid.

2. An artificial bait comprising a body portion abruptly terminating at its rear end to form an eddy producing shoulder, a pair of flexible leg members each connected to the rear of the body portion adjacent said shoulder and forming a continuation of one face of said body portion, each of said legs being relatively thin in proportion to its width and tapered convergingly from portions adjacent said shoulder, said bait being slotted on each side at the connected portion of said body portion and legs.

URBAN J. SCHREINER.
ALAN JONES.